United States Patent [19]
Dorval

[11] Patent Number: 5,456,037
[45] Date of Patent: Oct. 10, 1995

[54] SECURABLE FISHNET APPARATUS

[76] Inventor: Daniel J. Dorval, 206 N. Main St., Templeton, Mass. 01468-1424

[21] Appl. No.: 239,677

[22] Filed: May 9, 1994

[51] Int. Cl.$^6$ ................................... A01K 77/00
[52] U.S. Cl. ................................... 43/11; 24/3.2
[58] Field of Search ................. 43/11, 12, 7, 23, 43/25; 24/3.1, 3.2, 265 WS

[56] References Cited

U.S. PATENT DOCUMENTS

| | | | |
|---|---|---|---|
| 1,894,192 | 1/1933 | Olson | 43/12 |
| 2,176,052 | 10/1939 | Beyer | 24/3.2 |
| 2,455,765 | 12/1948 | Harvey | 43/11 |
| 2,841,847 | 7/1958 | Wallace | 43/11 |
| 3,627,182 | 12/1971 | Calkins | 24/3.2 |
| 4,587,757 | 5/1986 | Lirette | 43/11 |

*Primary Examiner*—P. Austin Bradley
*Assistant Examiner*—Chuck Y. Mah

[57] ABSTRACT

A securable fish net apparatus comprising a fishing net further comprising a racket having a generally annular head and a handle extended therefrom; and a mesh material coupled about the head of the racket to define a pocket for holding fish therein; a strap having a securement mechanism on one end and securable mechanism on the other end with the securable mechanism adapted to be coupled with the securement mechanism in a closed loop configuration about the wrist of a fisherman; a first coupling mechanism having one orientation for coupling the racket to the strap and another orientation for decoupling the racket from the strap; and a second coupling mechanism coupled to the racket and adapted to secure the handle to an arm of a fisherman; whereby when the strap is secured about the wrist of a fisherman, and when the racket is coupled to the strap with the first coupling mechanism, and when the second coupling mechanism is secured about his arm, his adjoining hand is free to control a hooked and netted fish.

5 Claims, 4 Drawing Sheets

SECURABLE FISHNET APPARATUS

BACKGROUND OF THE INVENTION

1. Field of the Invention

The present invention relates to a securable fishnet apparatus and more particularly pertains to allowing a fishing net to be held by a fisherman in a position such that both hands are free to control a netted and hooked fish with a securable fishnet apparatus.

2. Description of the Prior Art

The use of fishing nets is known in the prior art. More specifically, fishing nets heretofore devised and utilized for the purpose of controlling netted and hooked fish are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,803,742 to Foster discloses a multiple purpose game fish landing equipment. U.S. Pat. No. 4,125,956 to Killian discloses a dip net for fish and the like. U.S. Pat. No. 4,292,753 to Yesurantnam discloses a fish landing net. U.S. Pat. No. 4,980,988 to Whitman discloses a combination fish landing net holster and creel. Lastly, U.S. Pat. No. 5,099,597 to Whistle discloses a fishing net for sportsman.

While these devices fulfill their respective, particular objective and requirements, the aforementioned patents do not describe a securable fishnet apparatus that allows a net to be secured to the arm of a fisherman thereby freeing both his hands to hold and control a netted fish.

In this respect, the securable fishnet apparatus according to the present invention substantially departs from the conventional concepts and designs of the prior art, and in doing so provides an apparatus primarily developed for the purpose of allowing a fishing net to be held by a fisherman in a position such that both hands are free to control a netted and hooked fish.

Therefore, it can be appreciated that there exists a continuing need for new and improved securable fishnet apparatus which can be used for allowing a fishing net to be held by a fisherman in a position such that both hands are free to control a netted and hooked fish. In this regard, the present invention substantially fulfills this need.

SUMMARY OF THE INVENTION

In the view of the foregoing disadvantages inherent in the known types of fishing nets now present in the prior art, the present invention provides an improved securable fishnet apparatus. As such, the general purpose of the present invention, which will be described subsequently in greater detail, is to provide a new and improved securable fishnet apparatus and method which has all the advantages of the prior art and none of the disadvantages.

To attain this, the present invention essentially comprises, in combination, a fishing net. The fishing net includes a rigid racket having a generally annular head, a yoke peripherally extended from the head, and a handle extended outwards from the yoke and terminated at a base end with the base end having a bulb-shaped recess formed thereon. The fishing net includes a generally concave mesh material having a peripheral extent coupled about the head of the racket to define a pocket for holding fish therein. A plug is coupled to the yoke of the racket with the plug having a prong extended outwards therefrom and facing the base end of the handle. An elongated swivel is included and has a tip end and a bulb-shaped base end with the base end disposed within the recess of the handle for allowing pivotal and rotatable movement of the tip end. A flexible and looped tether is coupled to the tip end of the swivel with the tether adapted to be secured about the elbow of a fisherman. A wrist strap is included and has securement means on one end and securable means on the other end with the securable means adapted to be coupled with the securement means in a closed loop configuration about the wrist of a fisherman. Lastly, a socket is coupled to the wrist strap between the securement means and securable means thereof and having a socket hole disposed thereon adapted to be coupled with the prong of the plug on the racket in one orientation and decoupled from the prong of the plug in another orientation. When the wrist strap is secured about the wrist of a fisherman, and when the plug is coupled with the socket, and when the tether is secured about his adjoining elbow, his arm and the handle of fishing net are essentially locked in a generally aligned configuration, thus freeing his adjoining hand to control a hooked and netted fish.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved securable fishnet apparatus which has all the advantages of the prior art fishing nets and none of the disadvantages.

It is another object of the present invention to provide a new and improved securable fishnet apparatus which may be easily and efficiently manufactured and marketed.

It is a further object of the present invention to provide a new and improved securable fishnet apparatus which is of durable and reliable construction.

An even further object of the present invention is to provide a new and improved securable fishnet apparatus which is susceptible of a low cost of manufacture with regard to both materials and labor, and which accordingly is then susceptible of low prices of sale to the consuming public, thereby making such a securable fishnet apparatus economically available to the buying public.

Still yet another object of the present invention is to provide a new and improved securable fishnet apparatus which provides in the apparatuses and methods of the prior art some of the advantages thereof, while simultaneously overcoming some of the disadvantages normally associated therewith.

Even still another object of the present invention is to provide a new and improved securable fishnet apparatus for allowing a fishing net to be held by a fisherman in a position such that both hands are free to control a netted and hooked fish.

Lastly, it is an object of the present invention to provide a new and improved securable fishnet apparatus comprising a fishing net further comprising a racket having a generally annular head and a handle extended therefrom; and a mesh material coupled about the head of the racket to define a pocket for holding fish therein; a strap having securement means on one end and securable means on the other end with the securable means adapted to be coupled with the securement means in a closed loop configuration about the wrist of a fisherman; first coupling means having one orientation for coupling the racket to the strap and another orientation for decoupling the racket from the strap; and second coupling means coupled to the racket and adapted to secure the handle to the arm of a fisherman; whereby when the strap is secured about the wrist of a fisherman, and when the racket is coupled to the strap with the first coupling means, and when the second coupling means is secured about his arm, his adjoining hand is free to control a hooked and netted fish.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
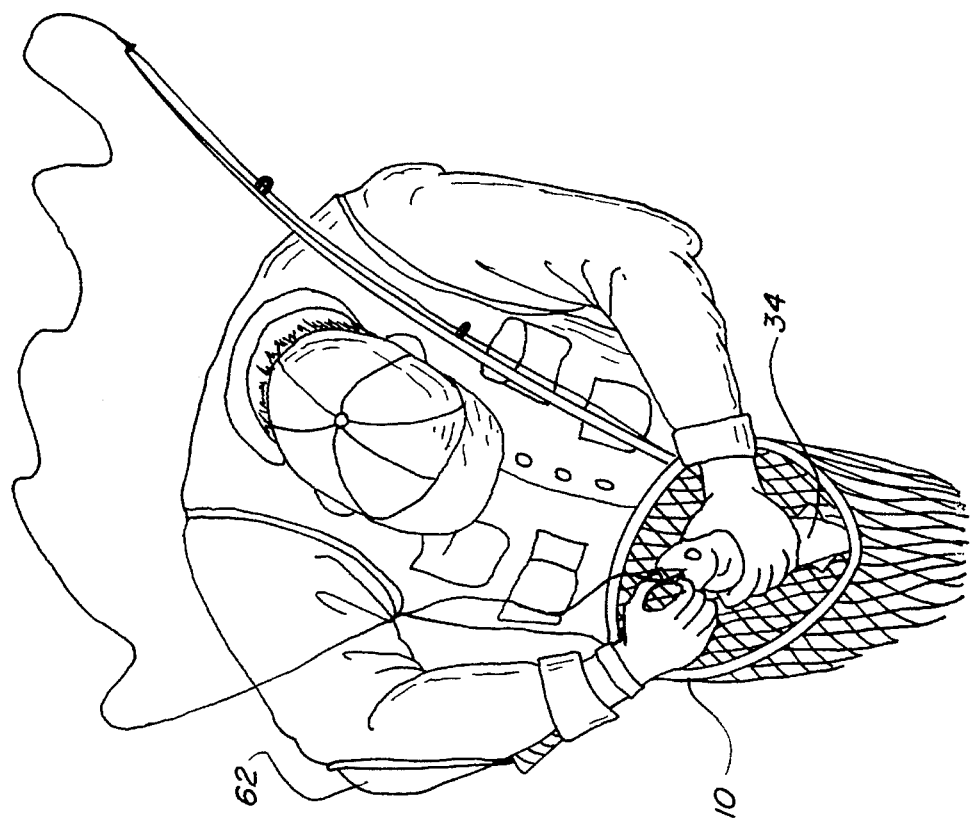
FIG. 1 is a perspective view of the preferred embodiment constructed in accordance with the principles of the present invention in operation in a coupled configuration on the right arm of a fisherman.
Figure 2:
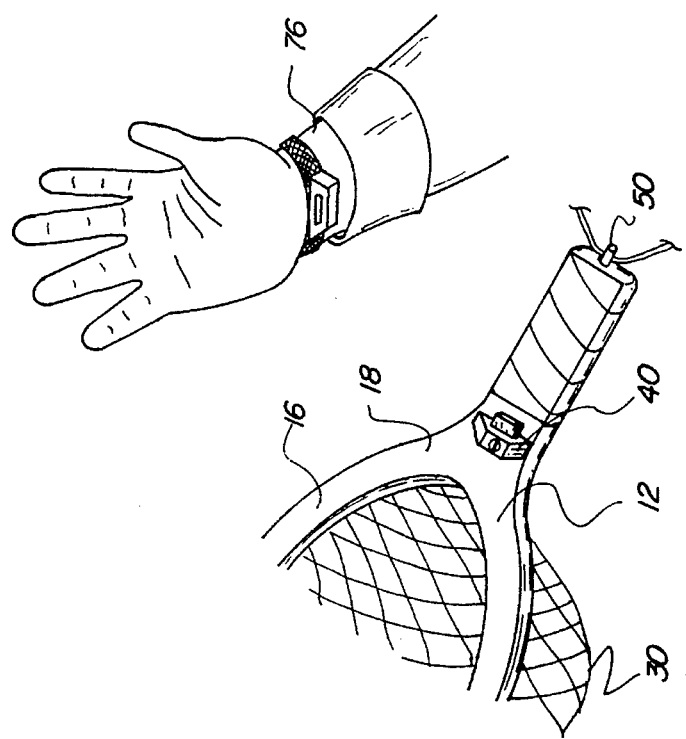
FIG. 2 is a perspective view of the present invention in a decoupled configuration for allowing free movement of a fisherman's arm relative to the fishing net.
Figure 3:
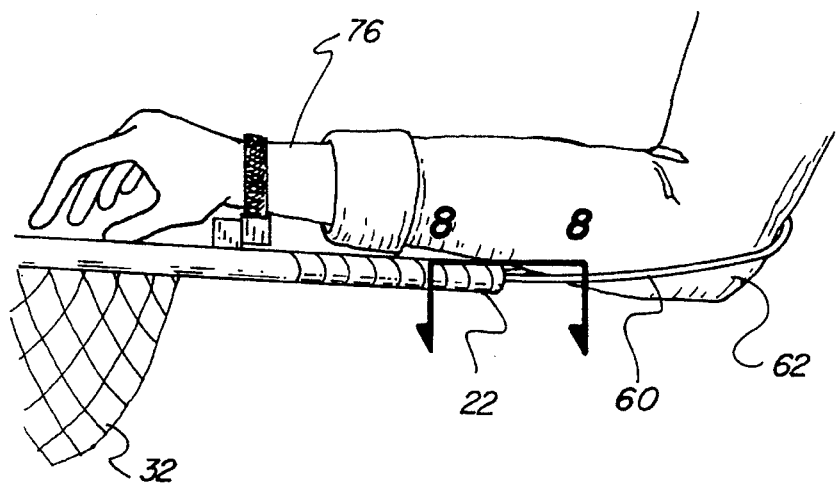
FIG. 3 is a side elevational view of the present invention in a coupled configuration such that a fisherman's arm is generally aligned along the handle of the fishing net and the tether is secured about his adjoining elbow, thus freeing his hand to control a netted and hooked fish.
Figure 5:
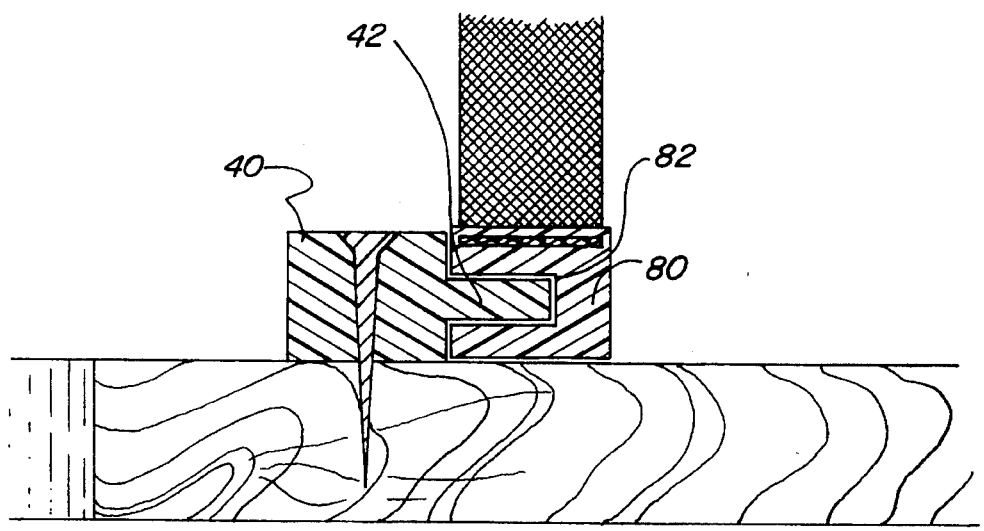
FIG. 5 is a cross-sectional view of the coupling between the plug on the fishing net and the socket on the wrist strap.
Figure 4:
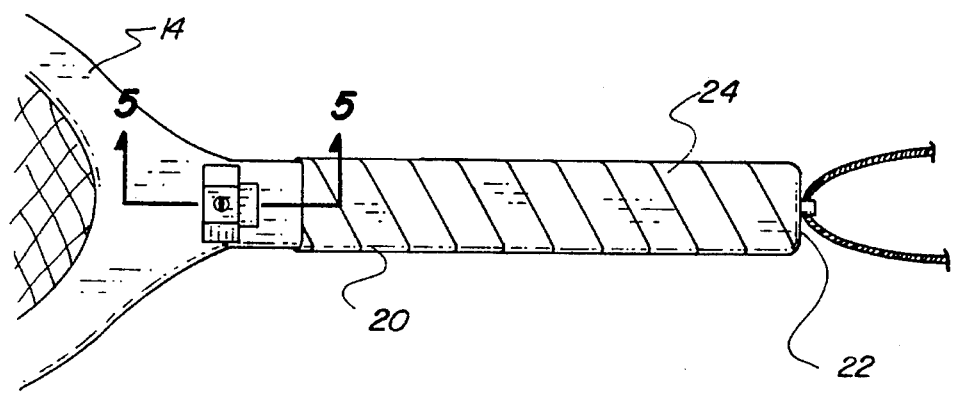
FIG. 4 is a plan view of the plug coupled to the yoke of the fishing net and the tether coupled to the handle of the fishing net.
Figure 6:
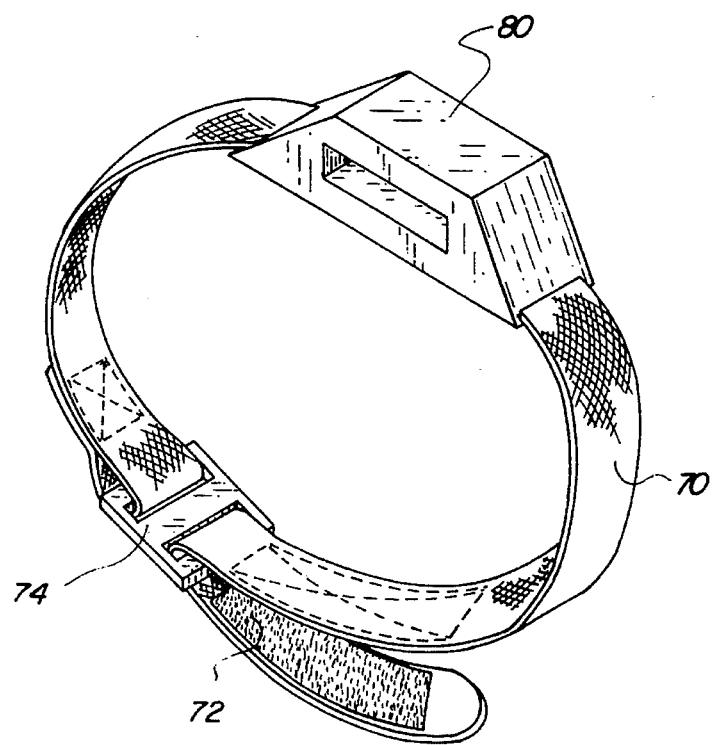
FIG. 6 is a perspective view of the socket coupled with the wrist strap.

With reference now to the drawings, and in particular, to FIG. 1 thereof, the preferred embodiment of the new and improved securable fishnet apparatus embodying the principles and concepts of the present invention and generally designated by the reference number 10 will be described.

Specifically, the present invention includes six major components. The major components are the fishing net, plug, swivel, tether, wrist strap, and socket. These components are interrelated to provide the intended function.

More specifically, it will be noted in the various Figures that the first major component is the fishing net 12. The fishing net includes two subcomponents. The subcomponents are the racket and the mesh material.

The first subcomponent of the fishing net is the racket 14. The racket is rigid in structure. It has a generally annular head 16, a yoke 18 peripherally extended from the head, and a handle 20 extended outwards from the yoke. The handle is terminated at a base end 22. A grip 24 is formed about the handle for allowing the user a firm hold of the racket. The base end has a bulb-shaped recess 26 formed thereon. The axial extent of the recess is aligned with the axially extent of the handle.

The second subcomponent of the fishing net is the mesh material 30. The mesh material is flexible in structure. The apertures of the mesh are sized with an extent adapted to hold a given size of fish. The strength of the mesh chosen is based upon the size and weight of the fish to be netted. The mesh material has a peripheral extent coupled about the head of the racket. This coupling defines a pocket 32 for holding netted fish 34 therein.

The second major component is the plug 40. The plug is generally box-shaped in structure. It is coupled to the yoke 18 of the racket with threaded screws. The plug has a prong 42 disposed thereon. The prong is extended outwards and positioned such that it is facing the base end 22 of the handle. The prong of the plug is adapted to be mated with a complimentary socket.

The third major component is the swivel 50. The swivel is elongated and rigid in structure. It has a tip end 52 and a bulb-shaped base end 54. The base end is disposed within the recess 26 of the handle. The peripheral extent of the recess of the handle secures the base end therein. In this configuration, the tip end of the swivel is pivotable and rotatable within the base end of the handle.

The fourth major component is the tether 60. The tether is flexible and looped in structure. The tether is coupled to the tip end 52 of the swivel. The tether is adapted to be secured about the elbow 62 of a fisherman. The tether thus holds the tip end of the handle against the arm of a fisherman.

The fifth major component is the wrist strap 70. The wrist strap is elongated in structure. It has a securement means on one end 72 and securable means 74 on the other end. The securable means is adapted to be coupled with the securement means in a closed loop configuration about the wrist 76 of a fisherman. The securable means consists of a buckle coupled to one end of the strap. The securement means consists of a pile type fastener disposed through the buckle and then secured to a complimentary pile type fastener positioned on the strap between one end thereof and the socket.

The sixth major component is the socket 80, The socket is coupled to the wrist strap 70 between the securement means 72 and the securable means 74. This coupling is performed with threaded screws. The socket consists of an essentially pyramid-shaped block. A lateral socket hole 82 is disposed on the socket. The socket hole is adapted to be coupled with the prong 42 of the plug on the racket 14 in one orientation. It is also adapted to be decoupled from the prong of the plug in another orientation. When the wrist strap is secured about the wrist of a fisherman, and when the plug is coupled with the socket, and when the tether is secured about his adjoining elbow, his arm and the handle of the fishing are essentially locked in a generally aligned configuration. This frees his adjoining hand to control a hooked and netted fish.

Figure 7:
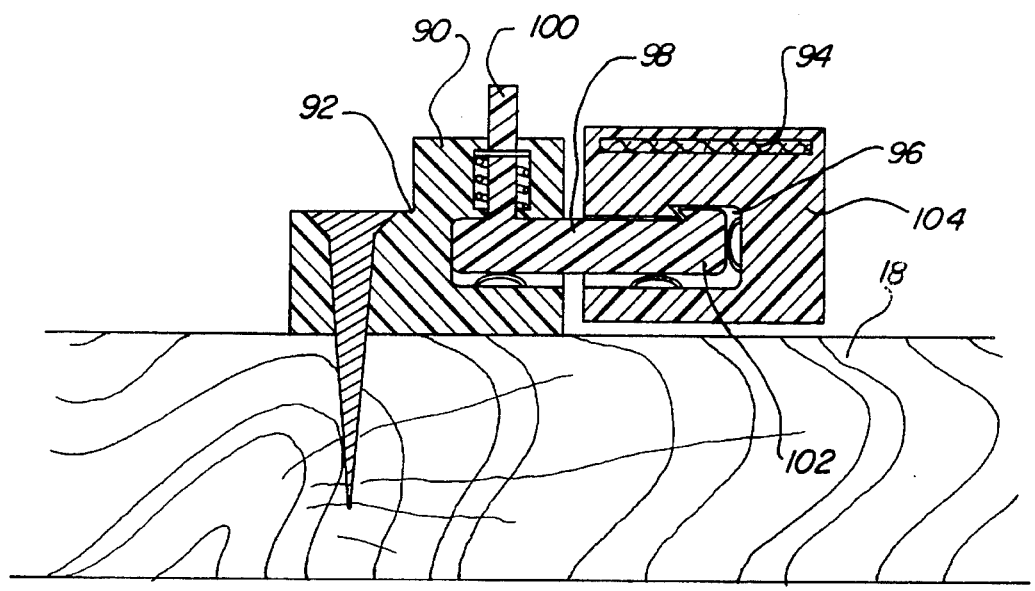
FIG. 7 is a cross-sectional view of the coupling between an alternate construction of the plug and an alternate construction of the socket.
Figure 8:
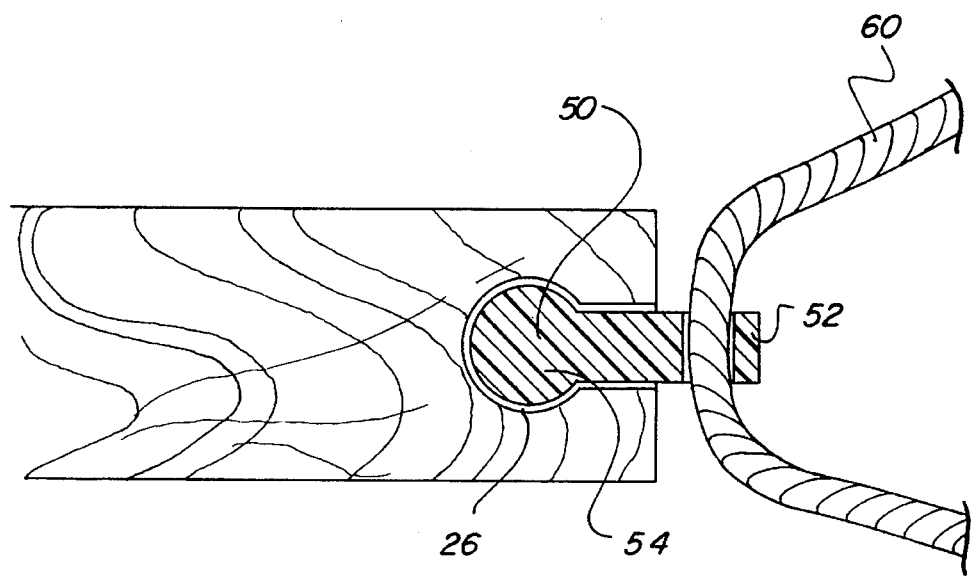
FIG. 8 is a cross-sectional view of the coupling between the tether, swivel, and handle of the fishing net taken along the line 7—7 of FIG. 3.

A second embodiment of the present invention includes a different mechanism for coupling the wrist strap to the fishing net as shown in FIG. 7. A first socket 90 is coupled to the yoke 18 with a threaded screw. The first socket has a first socket hole 92 disposed thereon and facing towards the base end of the racket. A second socket 94 is coupled to the wrist strap 70. The second socket includes a second socket hole 96. This second socket hole is adapted to be aligned with the first socket hole of the first socket. A socket pin 98 is disposed within the first socket hole with a spring-loaded switch 100 extended upwards therefrom and a latch 102 extended outwards therefrom and adapted to be coupled with the second socket. When the socket pin is mated with the second socket, the wrist strap is coupled to the racket. A plurality of leaf springs 102 are disposed within the first socket hole and second socket hole for ensuring that the coupling between the first socket and the second socket is maintained. By pushing on the spring-loaded switch, the socket pin is forced downwards, thereby releasing the second socket from the first socket.

When someone catches a fish, it is always difficult to remove the hook from the fish's mouth and hold the fish net positioned underneath the fish at the same time. After all, removing a hook from a vigorously moving fish is a task that requires both hands in itself. Holding a net in addition is more than most people can do effectively. Yet, if the fish is dropped and there is no net underneath, it may flop back into the water. With the present invention holding a net while unhooking a fish is not only feasible but relatively easy.

The present invention consists of an interlocking mechanism, one part of which is strapped to the wrist. The other part is fastened by a screw to the handle of the net, very close to where the handle ends and the rim of the net begins. These two pieces lock together in a purely mechanical way - the handle part has an extension that fits into a matching depression in the wrist part. When this is done, the hand wearing the wrist part of the mechanism is conveniently positioned so that it overhangs the inside of the net. This is ideal for removing a hook from a fish, for if the fish is dropped, it will fall into the net.

The product also features an elastic cord or retractable tether that is attached to the end of the net handle. The function of this cord is to maintain tension on the net during the unhooking process so that the two parts of the mechanism stay locked.

The idea is for a mechanism made up of two or more parts, used to keep a fish net stationary, and in a position so as to allow free use of both hands to control a netted, hooked fish and the hook.

One part of the mechanism is firmly attached to the lower side of the wrist, palm side, and the other is firmly attached to the yoke, "Y" shaped section, of a fly fishing net. The net is attached with an elastic cord, or retractable tether, and remains where it is attached until needed. When netting a fish, the person nets the fish in the usual manner, then mates the two mechanisms that are on the wrist and net. The spring tension of the cord or tether keeps the two mechanisms interlocked, thereby keeping the net in a stationary and managed position, freeing both hands. The interlocking parts are positioned on the net and wrist so that once interlocked, the hand that carries the interlocking mechanism is positioned within the net loop. The person can then hold the fish and hook without the net being dropped or unmanaged during unhooking of the fish. Once the fish is unhooked and the net is not needed, the net is then pulled in a direction away, from the arm until the two mechanisms unlock, and the net retracts back to its position where it remains until needed.

Alternately, there could be a simple lock incorporated into the mechanism so that when the two parts are joined, the lock snaps shut. It can then be opened by pushing a button when the fish is unhooked and safely in the net, and the user has a free hand to spare.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A securable fish net apparatus for allowing a fisherman to hold a fishing net in a position such that both hands are free to control a netted and hooked fish comprising, in combination:

a fishing net further comprising;
   a rigid racket having a generally annular head, a yoke peripherally extended from the head, and a handle extended outwards from the yoke and terminated at a base end with the base end having a bulb-shaped recess formed thereon; and a generally concave mesh material having a peripheral extent coupled about the head of the racket to define a pocket for holding fish therein;

a plug coupled to the yoke of the racket with the plug having a prong extended outwards therefrom and facing the base end of the handle;

an elongated swivel having a tip end and a bulb-shaped base end with the base end disposed within the recess of the handle for allowing pivotal and rotatable movement of the tip end;

a flexible and looped tether coupled to the tip end of the swivel with the tether adapted to be secured about the elbow of a fisherman;

a wrist strap having securement means on one end and securable means on the other end with the securable means adapted to be coupled with the securement means in a closed loop configuration about the wrist of a fisherman; and a socket coupled to the wrist strap between the securement means and securable means thereof and having a socket hole disposed thereon adapted to be coupled with the prong of the plug on the racket in one orientation and decoupled from the prong of the plug in another orientation;

whereby when the wrist strap is secured about the wrist of a fisherman, and when the plug is coupled with the socket, and when the tether is secured about his adjoining elbow, his arm and the handle of fishing net are essentially locked in a generally aligned configuration, thus freeing his adjoining hand to control a hooked and netted fish.

2. A securable fish net apparatus comprising:

a fishing net further comprising;
  a racket having a generally annular head and a handle extended therefrom; and
  a mesh material coupled about the head of the racket to define a pocket for holding fish therein;

a strap having securement means on one end and securable means on the other end with the securable means adapted to be coupled with the securement means in a closed loop configuration about the wrist of a fisherman;

first coupling means having one orientation for coupling the racket to the strap and another orientation for decoupling the racket from the strap; and second coupling means coupled to the racket and adapted to secure the handle to the arm of a fisherman;

whereby when the strap is secured about the wrist of a fisherman, and when the racket is coupled to the strap with the first coupling means, and when the second coupling means is secured about his arm, his adjoining hand is free to control a hooked and netted fish.

3. The securable fish net apparatus as set forth in claim 2 wherein the first coupling means includes a plug coupled to the handle and a socket coupled to the strap.

4. The securable fish net apparatus as set forth in claim 3 wherein the plug has a spring loaded switch for locking the plug to the socket and one orientation and unlocking the plug from the socket in another orientation.

5. The securable fish net apparatus as set forth in claim 2 wherein the second coupling means is a looped tether coupled to the handle at a location offset from the first coupling means.

* * * * *